United States Patent
Katz

(10) Patent No.: US 8,943,733 B2
(45) Date of Patent: Feb. 3, 2015

(54) ICE HOLE COVER

(76) Inventor: William Stephen Katz, Oakdale, MN (US)

( * ) Notice: Subject to any disclaimer, the term of this patent is extended or adjusted under 35 U.S.C. 154(b) by 151 days.

(21) Appl. No.: 13/435,725

(22) Filed: Mar. 30, 2012

(65) Prior Publication Data

US 2012/0246994 A1 Oct. 4, 2012

Related U.S. Application Data

(60) Provisional application No. 61/516,238, filed on Mar. 31, 2011.

(51) Int. Cl.
*A01K 97/01* (2006.01)

(52) U.S. Cl.
CPC ....................................... *A01K 97/01* (2013.01)
USPC ................................................................. 43/4

(58) Field of Classification Search
CPC .... A01K 97/01; A01K 91/06; A01K 89/0275
USPC ............................................................ 43/4, 17
See application file for complete search history.

(56) References Cited

U.S. PATENT DOCUMENTS

| | | | | |
|---|---|---|---|---|
| 2,083,062 | A | * | 6/1937 | Hampton .................... 294/68.22 |
| 3,466,781 | A | * | 9/1969 | Korany et al. ........................ 43/4 |
| 5,154,015 | A | * | 10/1992 | Pecard ................................. 43/4 |
| 6,675,523 | B1 | * | 1/2004 | Huiras et al. ......................... 43/4 |
| 6,729,066 | B1 | * | 5/2004 | Howley ............................ 43/54.1 |
| D556,799 | S | * | 12/2007 | Wang et al. .................. D15/199 |

\* cited by examiner

*Primary Examiner* — David Parsley
*Assistant Examiner* — George Andonyan
(74) *Attorney, Agent, or Firm* — Jacobson and Johnson; Thomas N. Phung

(57) ABSTRACT

An ice fishing hole cover comprising a cover body having a top surface, a bottom surface, and an edge surface surround the cover body, a fishing line access extending through the cover body from the top surface to the bottom surface, a fishing line removal guide extending from the fishing line access to the edge surface of the cover body, and a set of vent holes preventing the ice hole from freezing or closing up.

16 Claims, 4 Drawing Sheets

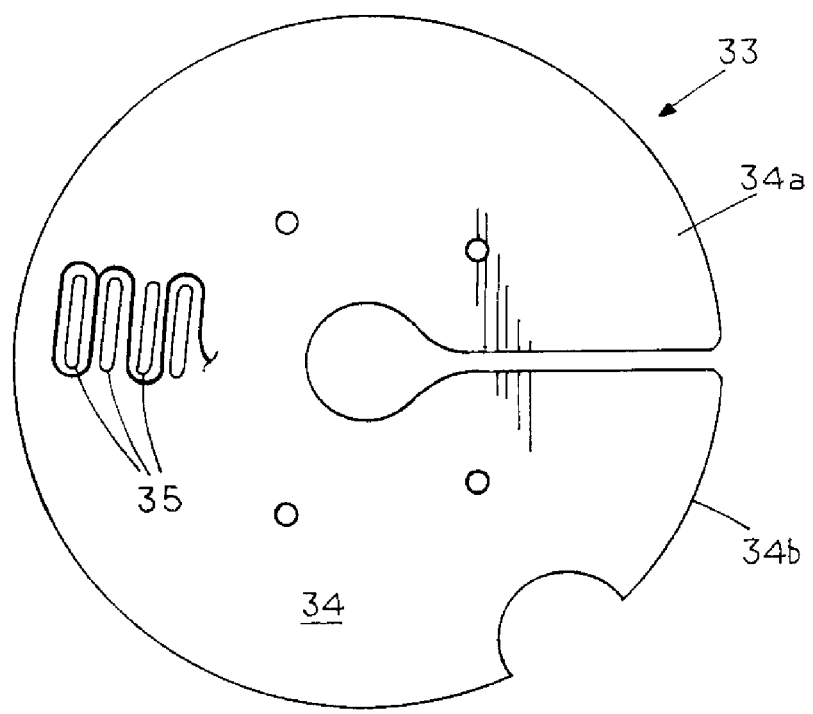

US 8,943,733 B2

ICE HOLE COVER

CROSS REFERENCE TO RELATED APPLICATIONS

This application claims priority to currently pending U.S. Provisional Application Ser. No. 61/516,238; filed on Mar. 31, 2011; titled ICE HOLE COVER.

FIELD OF THE INVENTION

This invention relates generally to ice fishing hole covers and, more specifically to a fishing hole cover for allowing continuous fishing while preventing or minimizing the lost of article through a fishing hole within a fish house.

STATEMENT REGARDING FEDERALLY SPONSORED RESEARCH OR DEVELOPMENT

None

REFERENCE TO A MICROFICHE APPENDIX

None

BACKGROUND OF THE INVENTION

Icehouses for fishing on a frozen surface of a body of water are well known. A typical fish house comprises a floor, one or more walls and a ceiling. Within the floor of the icehouse is one or more fishing holes extending through the ice surface for allowing the fisherman access to the fishes within the lake(s).

One of the main problems associated with fishing in fish houses is valuable items such as watches, cellular phones, wallets and the like can often time fall into the ice hole(s) thereby resulting in their permanent lost. There thus is a need for a device for preventing the accidental lost of articles in ice hole(s) while allowing users to continuously fish in the ice fishing hole.

SUMMARY OF THE INVENTION

The present invention comprises an ice fishing hole cover having a cover body that includes a top surface, a bottom surface, and an edge surface surround the cover body. The cover body may comprise a circular, rectangular, square shaped body or the like and is composed of a preferably transparent material capable of supporting the user's weight over the ice hole. Extending through the cover body from the top surface to the bottom surface a fishing line access for receiving a fishing line therethrough to allow a user to fish in the ice fishing hole while simultaneous preventing the accidental lost of articles in the ice fishing hole.

The ice fishing hole cover also includes a fishing line removal guide extending from the fishing line access to the edge surface of the cover body to permit removal of the cover body from an ice fishing hole without disturbing a fishing line extending therethrough. The ice fishing hole cover may also include a set of vent holes to allow for air movement through the cover body to help preventing the ice hole from freezing or closing up and a protruding member extending from the bottom surface of the cover body with the protruding member having an outer peripheral surface similar in size to an inner peripheral surface of the ice fishing hole to provide for a one step installation of the ice hole cover.

BRIEF DESCRIPTION OF THE DRAWINGS

FIG. 7 is a top view showing an ice fishing hole cover that includes a wire holder and a fish finder access.

DESCRIPTION OF THE PREFERRED EMBODIMENT

Figure 1:
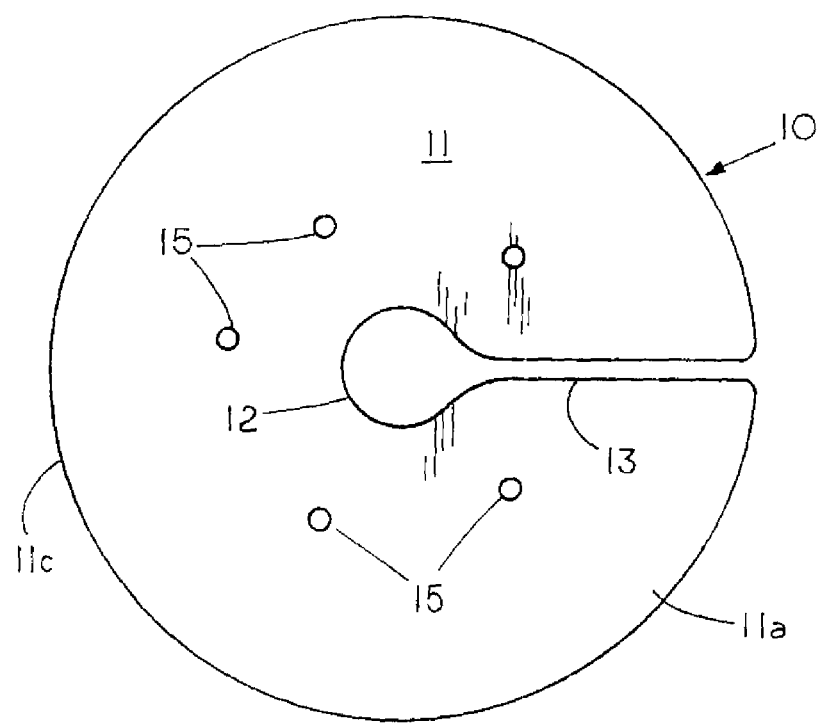
FIG. 1 shows a top view of an embodiment of an ice hole cover.
Figure 2:
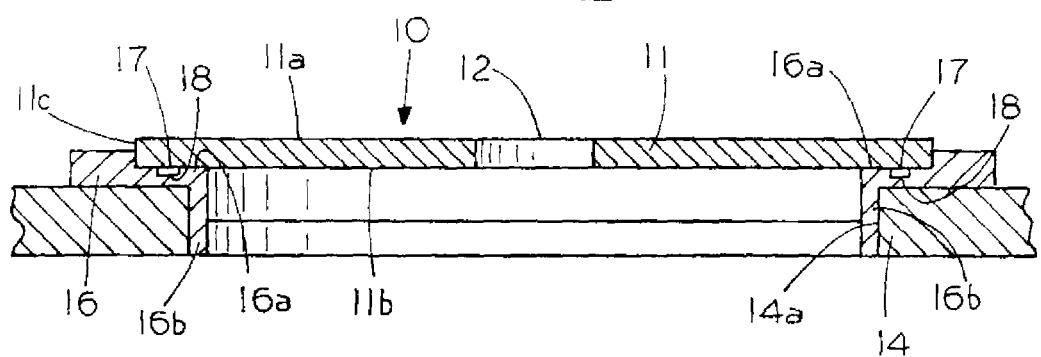
FIG. 2 shows a cross-sectional view of the ice hole cover of FIG. 1 supported over an ice fishing hole by an ice hole ring.

Referring to FIGS. 1 and 2, the ice hole cover 10 of the present invention as shown in. FIGS. 1 and 2 generally comprises a cover body 11 having a top surface 11a, a bottom surface 11b, and an edge surface 11c surrounding cover body 11. Although cover body of the ice hole cover of the present invention may comprise different thickness, cover body 11 preferably comprises a thickness defined by the distance between top surface 11a and bottom surface 11b of less than 1 inches. For cover bodies having thickness greater than 1 inch, such cover bodies may include a portion of the body that tapers outward towards the surrounding edge of the cover body to reduce or prevent tripping Ice hole cover 10 includes a fishing line access 12 extending through cover body 11 from top surface 11a to bottom surface 11b for receiving a fishing line therethrough to enable the user to ice fish while ice hole cover 10 is in use covering a ice fishing hole, that is, to allow a user to fish in the ice fishing hole while simultaneous preventing the accidental lost of articles in the ice fishing hole.

Although the fishing line access 12 of the ice hole cover 10 may also comprise a variety of shapes and sizes, the fishing line access 12 of FIGS. 1 and 2 is shown as comprising a tear drop shaped configuration having a size sufficiently small to prevent keys and cell phones from passing therethrough while being sufficiently large to allow not only a baited line to extend therethough but also a user's finger to extend therethrough to enable the gripping support of cover body 11. Providing the user gripping support of cover body 11 helps to facilitate the installation of hole cover 10 to ice fishing hole 14 and removal of the hole cover 10 from ice fishing hole 14. An example of a suitable sized fishing line access may comprise one having a diameter of 2 inches or less.

The embodiment of FIGS. 1 and 2 also shows ice hole cover 10 including a fishing line removal guide 13 extending from fishing line access 12 to edge surface 11c of cover body 10. Fishing line removal guide 13 functions to enable removal of cover body 10 from an ice fishing hole 14 without disturbing or affecting a fishing line extending through fishing line access 12 and ice fishing hole 14. For example, in use of ice hole cover 10 over ice fishing hole 14, if a fish is hooked on the fishing line, fishing line access 12 is sized to likely prevent the removal the fish therethrough. Fishing line removal guide 13 enables the user to simultaneously remove ice hole cover 10 from ice fishing hole 14 and the fishing line from ice hole cover 10 to allow for the removal of the fish from ice fishing hole 14.

Ice hole cover 10 is also shown in FIGS. 1 and 2 including a set of vent holes such as a set of finger accessible vent holes 15 with set of finger accessible vent holes 15 functioning to allow for air movement through cover 11 body thereby helping to prevent ice fishing hole 14 from freezing or closing up while allowing a user's finger to extend therethrough to enable the gripping support of cover body 11. Providing the user gripping support of cover body 11 helps to facilitate the installation of hole cover 10 to ice fishing hole 14 and removal of the hole cover 10 from ice fishing hole 14.

Although the body of the ice hole cover of the present invention many comprise a variety of shapes and sizes, in the embodiment of FIGS. 1 and 2, cover body 11 is shown as having a circular shaped body. Cover body 11 maybe be made from a variety of material including opaque or non-transparent materials but preferably is made from a transparent material to enable users to view through cover body 11 and into the ice fishing hole. In addition, cover body 11 may come in a variety of different colors and may include light kits for view purposes and fan kits to help drive warmer air through the vent holes 15 and into ice fishing hole 14 to further prevent ice fishing hole 14 from freezing up.

Another feature of the present invention is that the ice hole cover of the present invention is made from a material that has the safety advantage of being capable of supporting the user's weight over ice fishing hole 14 in the event that the user accidentally or purposefully steps on the ice hole cover while the ice hole cover is in use. An example of the aforementioned would be an ice hole cover made from a material that capable of supporting a weight of up to 400 lb. over ice fishing hole 14 while the ice hole cover is in use FIG. 2 shows ice hole cover 10 of FIG. 1 in use in conjunction with a typical ice hole ring 16 over ice fishing hole 14. Ice hole rings are known in the art and an example of an ice hole ring can be found in U.S. Pat. No. 6,675,523. In use, a flange 16b of ice hole ring 16 is first fitted to the inner peripheral 14a of ice fishing hole 14. Ice hole ring 16 includes an inner peripheral surface 16a for supporting the ice hole cover 10 thereon. To prevent movement of ice hole cover 10 with respect to ice hole ring 16, the embodiment of ice hole cover 14 shown in FIG. 2 includes a set of stop members 17 mateable with corresponding slots 18 located on the inner peripheral surface 16a of ice hole ring 16. It should be noted that set of stop members 17 and slots 18 may comprise of various shapes and sizes and with slots 18 being shaped and sized to be matingly engageable with stop members 17.

Figure 3:
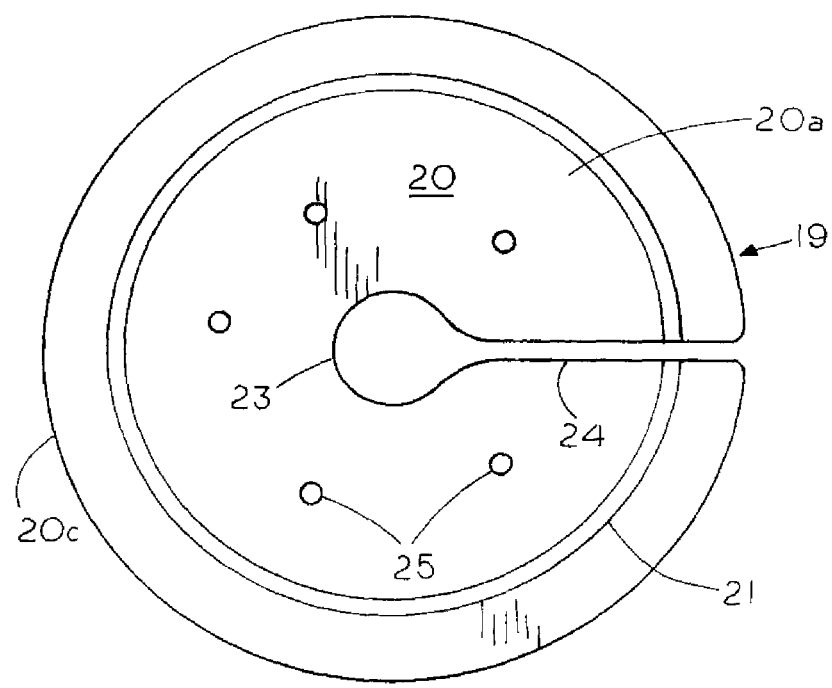
FIG. 3 shows a bottom view of an alternative embodiment of the ice hole cover having a ring member protruding from the bottom surface of the body of the ice hole cover.
Figure 4:
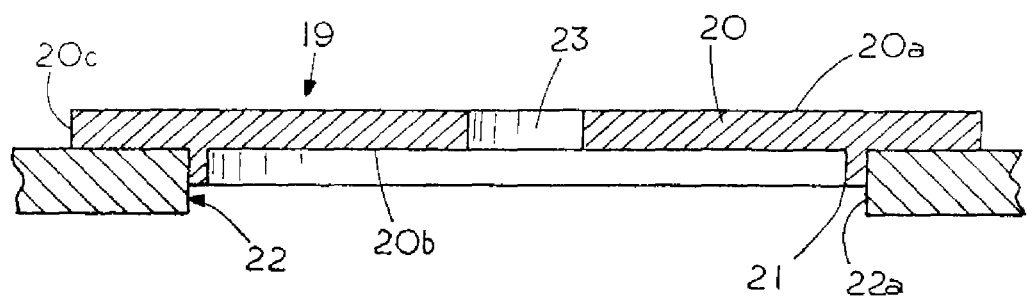
FIG. 4 is a cross-sectional view showing the ice hole cover of FIG. 3 supported over a typical ice fishing hole.

Referring to FIGS. 3 and 4, FIG. 3 shows a bottom view of an alternative embodiment of the ice hole cover 19 of the present invention. As shown in FIG. 3, ice hole cover 19 comprises similar components to ice hole cover 10 of FIGS. 1 and 2, namely a cover body 20 having a top surface 20a, a bottom surface 20b, an edge surface 20c surrounding cover body 20, a fishing line access 23, a fishing line removal guide 24 extending from fishing line access 23 to edge surface 20c of cover body 19, and a set of vent hole 25. However, unlike ice hole cover 10 of FIGS. 1 and 2, ice hole cover 19 includes a protruding member such as a ring member 21 extending from bottom surface 20a of cover body 20. Although the protruding member may comprises of a variety of shapes and sizes, ring member 21 is shown in the embodiment of FIG. 3 having an outer circumference similar in size to an inner peripheral surface of an ice fishing hole to provide for a one step fitted installation of the ice hole cover 19 to the ice fishing hole. FIG. 4 is a cross-sectional view showing ice hole cover 19 in use over a typical ice fishing hole 22. In use, ring member 21 is fitted to an inner peripheral 22a of ice fishing hole 22 to provide for a one step fitted or non-fitted installation of the ice hole cover 19 to ice fishing hole 22 without the need of the use of an ice hole ring similar to ice hole ring 16 of FIG. 2.

Figure 5:
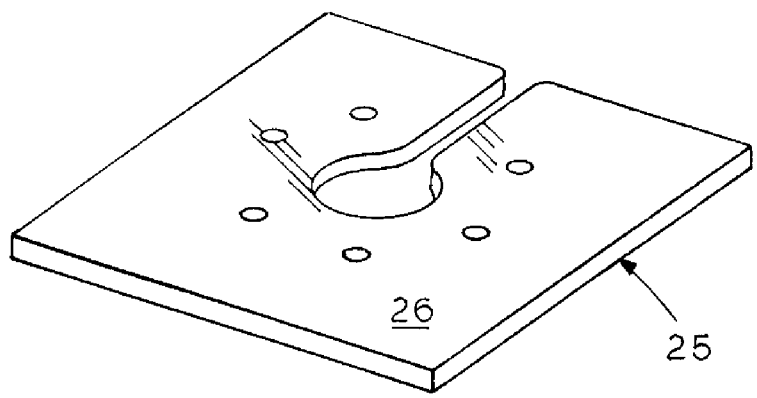
FIG. 5 is a perspective view showing an ice fishing hole cover having a square shaped cover body.

FIG. 5 is a perspective view showing an alternative embodiment of an ice fishing hole cover 25 having similar components to ice hole cover 10 of FIGS. 1 and 2. However, unlike ice hole cover 10, ice fishing hole cover 25 comprises a cover body 26 having a square shape instead of a circular shape.

Figure 6:
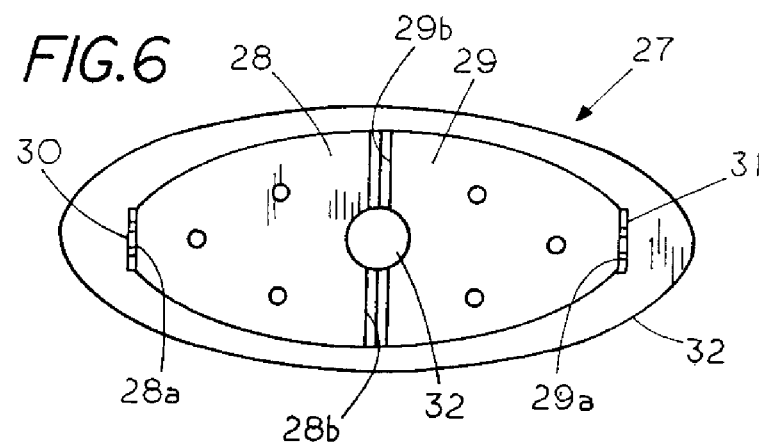
FIG. 6 is a perspective view showing an ice fishing hole cover having a set of swinging half covers mounted to an outer frame by a set of spring loaded hinges.
Figure 6A:
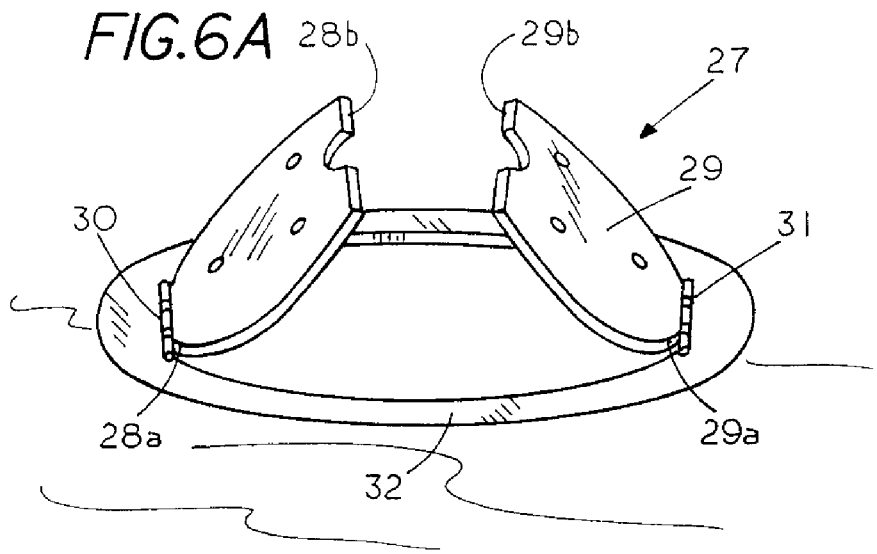
FIG. 6A is a perspective view showing the ice fishing hole cover of FIG. 6 in an open condition.

Referring to FIGS. 6 and 6A, FIG. 6 is a perspective view showing an alternative embodiment of an ice fishing hole cover 27 in a closed condition. Ice fishing hole cover 27 comprises a set of swingable half covers 28, 29 mounted to an outer frame 32 by a set of hinges, and preferably a set of spring loaded hinges 30, 31. More specifically, a first end 28a of swingable half cover 28 is mounted to outer frame 32 by spring loaded hinge 30 and a first end 29a of swingable half cover 29 is mounted to outer frame 32 by spring loaded hinge 30. Ice fishing hole cover 27 is identified in the closed condition by a second end of 28b of swingable half cover 28 and a second end of 29b of swingable half cover 29 cooperating to form a fishing line access 32.

FIG. 6A is a perspective view showing ice fishing hole cover 27 of FIG. 6 in an open condition, which is identified by swingable half covers 28, 29 being extended or propped upwards such that the second ends 28b, 29b of swingable half covers 28, 29 are located upwards distal from outer frame 32. It is noted that unlike the ice hole covers of FIGS. 1-5, ice fishing hole cover 27 does not include a fishing line removal guide. Although fishing line access 32 is also sized to likely prevent the removal a fish therethrough when ice fishing hole cover 27 in the closed condition, a feature of ice fishing hole cover 27 is that when ice fishing hole cover 27 in the open condition the swingable half covers 28, 29 are sufficiently spaced from each other to allow for the removal of the fish therethrough without the need to remove ice fishing hole cover 27 from the ice fishing hole. That is, when in use with a fishing line extended through, if a fish is hooked on the fishing line, ice fishing hole cover 27 may be converted from the closed condition to the open condition through movement of swingable half covers 28, 29 allow the user to remove the fish from ice fishing hole. After the fish has been removed from the ice fishing hole ice fishing hole cover 27 may be converted from the open condition back to the closed condition again through movement of swingable half covers 28, 29.

FIG. 7 is a top view showing an alternative embodiment of an ice fishing hole cover 33 having similar components to ice hole cover 10 of FIGS. 1 and 2. However, ice fishing hole cover 33 includes a cover body 34 having a wire holder comprising a set of protrusions 35 that are individually spaced from each other with the protrusions extending from a top surface 34a of cover body 34 and having surfaces for engagement with a portion of a wire thereto and a fish finder access 36 for supporting a sensor of a fish finder therethrough. Although the fish finder access may be located at various regions on cover body 34, fish finder access 36 is shown in the embodiment of FIG. 7 extending inward from an edge surface 34b of cover body 34.

I claim:
1. An ice fishing hole cover comprising:
a cover body having a top surface, a bottom surface, and an outer most peripheral edge surface surrounding said cover body;

a fishing line access extending through said cover body from said top surface to said bottom surface for receiving a fishing line therethrough, said fishing line access having a size sufficiently small to prevent keys and cell phones from passing therethrough;

a fishing line removal guide extending from said fishing line access to said outer most peripheral edge surface of said cover body to permit removal of said cover body from an ice fishing hole without disturbing a fishing line extending therethrough;

a set of finger accessible vent holes, said set of vent holes sized for allowing air movement through said cover body to help prevent said ice hole from freezing or closing up while allowing a user's finger to extend therethrough to enable the gripping support of said cover body; and a wire holder comprising a set of protrusions that are proximate and individually spaced from each other with the protrusions located at an offset angle from the line removal guide of the cover body, said protrusions having surfaces for engagement such that the fishing line is interwoven between the protrusions.

2. The ice fishing hole cover of claim 1 wherein said cover body comprises a circular shaped body.

3. The ice fishing hole cover of claim 2 wherein said cover body is transparent.

4. The ice fishing hole cover of claim 3 wherein said cover body is composed of a material capable of supporting the user's full weight over said ice hole.

5. The ice fishing hole cover of claim 3 wherein said fishing line access comprises a teardrop shaped configuration to prevent said fishing line from catching against said cover body during removal of said cover body from said ice fishing hole.

6. The ice fishing hole cover of claim 3 wherein said cover body comprises a thickness of less than 1 inch.

7. The ice fishing hole cover of claim 3 including an ice hole ring having a flange fitted to the inner peripheral of an ice fishing hole and a inner peripheral surface for supporting the cover body thereon.

8. The ice fishing hole cover of claim 7 including a set of stop members located on said bottom surface of said cover body, said set of stop members mateable with slots located on said inner peripheral surface of said ice hole ring to prevent movement of said cover body with respect to said ice hole ring.

9. An ice fishing hole cover comprising:
a one-piece cover body having a top surface, a bottom surface, and an outer most peripheral edge surface surrounding said cover body, said cover body having a thickness between said top surface and said bottom surface of less than 1 inch, said cover body composed of a transparent material capable of supporting the user's weight full over said ice hole;

a fishing line access having teardrop shaped configuration, said fishing line access extending through said cover body from said top surface to said bottom surface for receiving a fishing line therethrough, said fishing line access having a size sufficiently small to prevent keys and cell phones from passing therethrough;

a fishing line removal guide extending from said fishing line access to said outer most peripheral edge surface of said cover body to permit removal of said cover body from an ice-fishing hole without disturbing a fishing line extending therethrough;

a set of finger accessible vent holes, said set of vent holes sized for allowing air movement through said cover body to help prevent said ice hole from freezing or closing up while allowing a user's finger to extend therethrough to enable the gripping support of said cover body; and a wire holder comprising a set of adjacent protrusions that are individually spaced from each other with the protrusions located an offset angle with said fishing line removal guide and said line access located on an opposing side of the cover body, said protrusions having surfaces for engagement such that the fishing line is interwoven between the protrusions.

10. The ice fishing hole cover of claim 9 wherein said cover body comprises a circular shaped body.

11. The ice fishing hole cover of claim 9 wherein said cover body comprises a rectangular, or square shaped body.

12. The ice fishing hole cover of claim 9 wherein said cover body is composed of a material capable of supporting a full weight up to 400 lbs over said ice hole.

13. The ice fishing hole cover of claim 9 including a protruding member extending from said bottom surface of said cover body, said protruding member having an outer peripheral surface similar in size to an inner peripheral surface of an ice fishing hole to provide for a one-step installation of the ice hole cover.

14. The ice fishing hole cover of claim 9 wherein said cover body includes a fish finder access.

15. An ice fishing hole cover comprising:
a one-piece cover body having a top surface, a bottom surface, and an outer most peripheral edge surface surrounding said cover body, said cover body having a thickness between said top surface and said bottom surface of less than one inch, said cover body composed of a transparent polymer plastic capable of supporting a full weight up to 400 lbs over said ice hole;

a fishing line access having teardrop shaped configuration, said fishing line access extending through said cover body from said top surface to said bottom surface for receiving a fishing line therethrough, said fishing line access having a size sufficiently small to prevent keys and cell phones from passing therethrough;

a fishing line removal guide extending from said fishing line access to said outer. most peripheral edge surface of said cover body to permit removal of said cover body from an ice-fishing hole without disturbing a fishing line extending therethrough;

a set of finger accessible vent holes located within the outer most peripheral edge surface of said cover body, said set of vent holes sized for allowing air movement through said cover body to help prevent said ice hole from freezing or closing up while allowing a user's finger to extend therethrough to enable the gripping support of said cover body;

a wire holder comprising a set of protrusions that are proximate and individually spaced from each other with the protrusions located in-line with said fishing line removal guide and said line access located on an opposing side of the cover body, said protrusions having surfaces for engagement such that the fishing line is interwoven between the protrusions. and a circular shaped protruding member extending from said bottom surface of said cover body, said protruding member having an outer peripheral surface that directly and matingly engages with an inner peripheral surface of an ice fishing hole to provide for a one-step installation of the ice hole cover.

16. The ice fishing hole cover of claim 15 wherein said cover body comprises a rectangular, or square shaped body.

* * * * *